United States Patent [19]

Overbay

[11] Patent Number: 4,841,118
[45] Date of Patent: Jun. 20, 1989

[54] ORBITAL WELD HEAD TOOL

[75] Inventor: Mark A. Overbay, East Ridge, Tenn.

[73] Assignee: Combustion Engineering, Inc., Windsor, Conn.

[21] Appl. No.: 205,399

[22] Filed: Jun. 9, 1988

Related U.S. Application Data

[63] Continuation-in-part of Ser. No. 28,997, Mar. 23, 1987, and a continuation-in-part of Ser. No. 55,280, May 28, 1987.

[51] Int. Cl.$^4$ ............................................. B23K 9/225
[52] U.S. Cl. ........................... 219/124.03; 219/60.2; 219/125.11
[58] Field of Search ............. 219/60.2, 124.03, 125.11

[56] References Cited

U.S. PATENT DOCUMENTS

| | | | |
|---|---|---|---|
| 3,946,191 | 3/1976 | Graham | 219/60.2 |
| 4,359,621 | 11/1982 | Monley | 219/60.2 |
| 4,629,853 | 12/1986 | Yttergren et al. | 219/124.03 |

Primary Examiner—Clifford C. Shaw
Attorney, Agent, or Firm—John H. Mulholland

[57] ABSTRACT

An orbital weld head tool (10) has an orbiting and reciprocating carriage (22) for movement around a mandrel (12) fixed to a workpiece. Reciprocation is by a ball nut and screw drive means (70,74) driven by an arc voltage controlled motor (64). Rotation of carriage (22) with its ceramic shielded tungsten weld tip (16) and gas conduit (19) is by means of a separate motor (62) and drive belt (28). Power is supplied from a flexible hose connected through a conductive ball bearing assembly (30) and a conductive shoe (20) for weld tip (16) mounted on carriage (22).

13 Claims, 3 Drawing Sheets

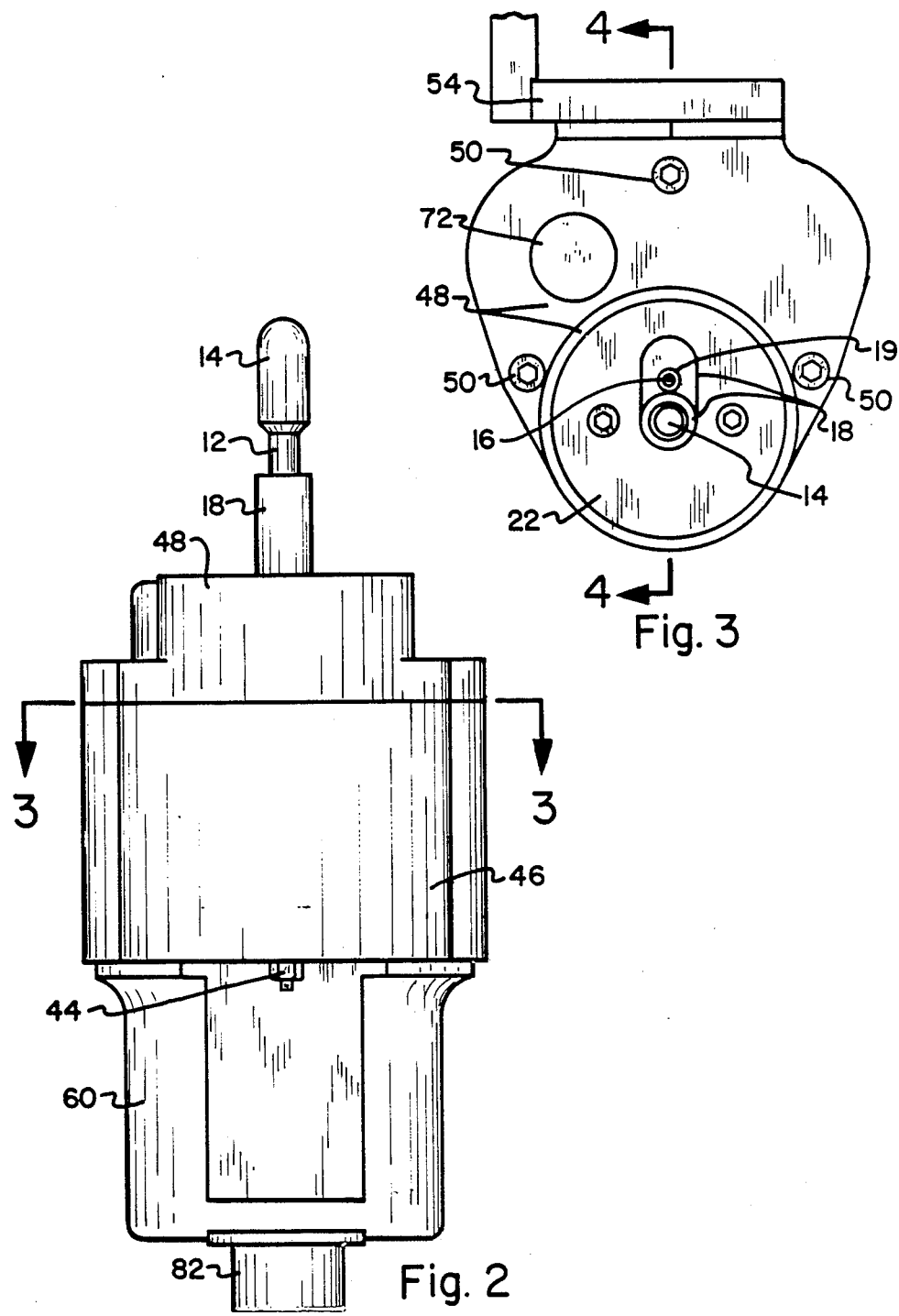

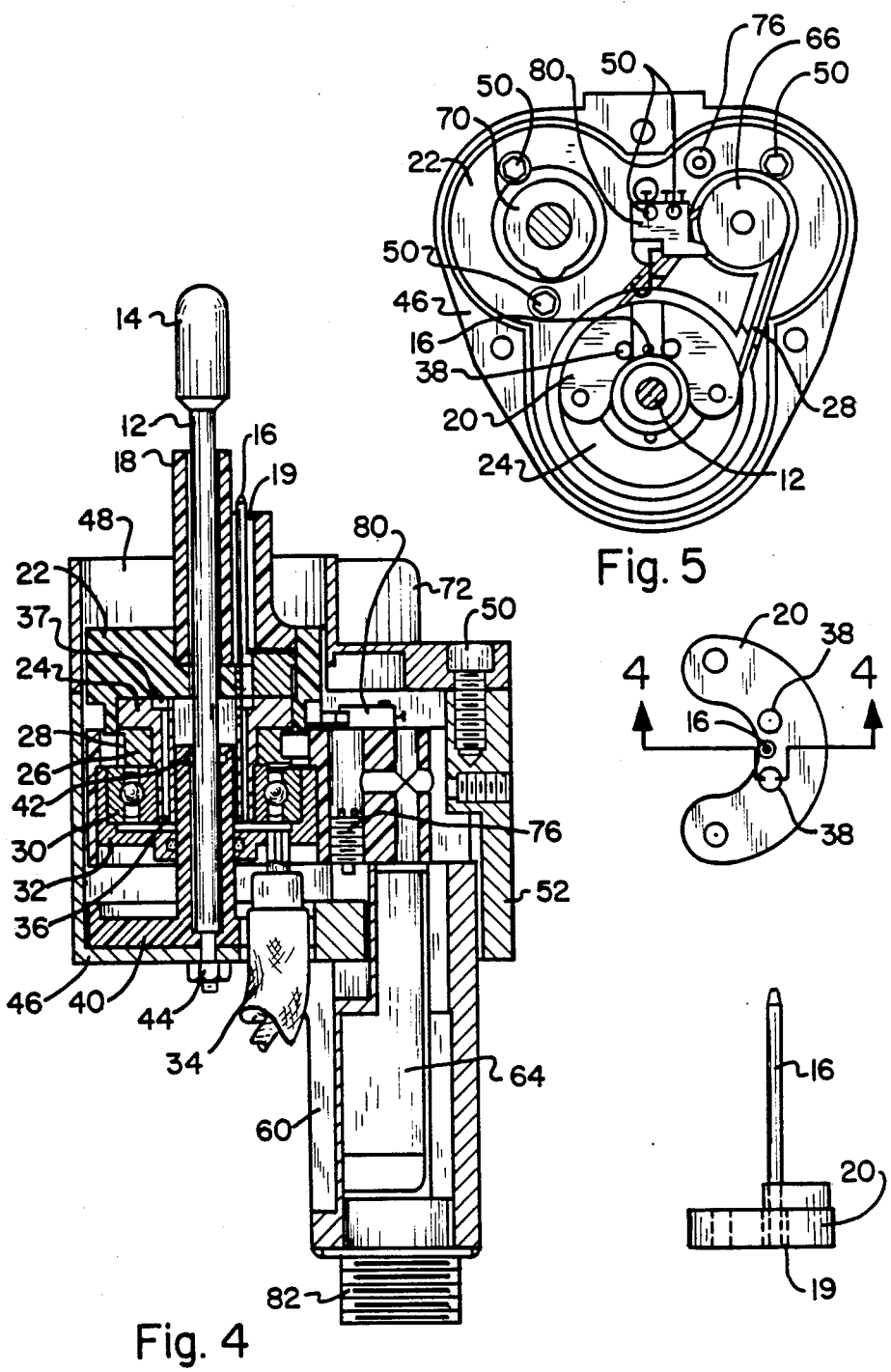

ORBITAL WELD HEAD TOOL

CROSS REFERENCE TO RELATED APPLICATION:

This application is a continuation-in-part of U.S. patent application Ser. No. 028,997 filed Mar. 23, 1987 and a continuation-in-part of U.S. patent application Ser. No. 055,280, both filed by Mark Albert Overbay, the inventor of the instant application and both assigned to the assignee, Combustion Engineering, Inc., of the instant application.

BACKGROUND OF THE INVENTION

The improved orbital automatic voltage control weld head tool of the invention is particularly adapted for use in the field of service and maintenance of steam generators and, specifically, steam generators of nuclear steam supply systems.

Automatic arc welding tools are known which create movement in response to arc current or voltage, as mentioned in U.S. Pat. No. 4,575,612. Circular path orbiting weld heads with ceramic or insulative sheathing, inert gas shielding and a tungsten weld tip are known for use when fixed in position on a workpiece, see, for example, U.S. Pat. Nos. 3,084,243; 3,350,537; 3,740,520; 4,580,028 and Canadian Pat. No. 715,679, issued Aug. 10, 1965, a copy of which is in the examiner's art collection in the U.S. Patent and Trademark Office at 219/60.2.

In any rotary or orbital weld head structure, it is important to pass the welding current or voltage from a relatively fixed structure to a rotating structure. U.S. Pat. Nos. 3,132,421; 3,395,263; 3,740,520; 3,701,072 and 3,784,782 have been cited as pertinent to patentability and this problem in the aforementioned Ser. No. 28,997 of the inventor. Also mentioned in that application, for these reasons, is Soviet Union Document No. 574,800 dated Sept. 1977, a copy of which is in the examiner's art collection in the U.S. Patent and Trademark Office at 439/17. U.S. Pat. No. 3,784,782 also provides a current path from fixed to rotating members.

Despite the existence of the noted prior endeavors in the art, there has been a need for an improved compact tool for use in orbital automatic voltage control welding of nozzle dam inserts, steam generator tube plugs, tube sheet plugs, sleeve plugs and sleeve welds. This need is especially great for a tool which can conveniently operated from the end of a manipulator arm of the type used below steam generator tube sheets in nuclear steam supply systems.

A primary goal in producing maintenance and service tools, including orbital weld heads for use in nuclear steam supply system components, is to provide a tool which eliminates or minimizes the exposure time to radioactivity of the service personnel. The improved orbital weld head, when mounted on a manipulator arm, accomplishes one hundred percent (100%) tube sheet coverage and is very versatile.

SUMMARY OF THE INVENTION

The weld head incorporates a ball bearing connector as a means of transferring motion and electrical power to the weld head. In combination with the stationary mandrel for engaging a feature of the workpiece and aligning and positioning the tool relative to the center of a desired circular weld path on the workpiece, the ball bearing connector assembly transfers power to a carriage which rotates about the mandrel and carries a tungsten weld tip. The weld tip creates a controlled arc between it and the workpiece by means of an arc voltage controller which senses the arc voltage and controls an arc voltage control motor for advancing or retracting the rotating carriage and weld tip thereon in response thereto. A drive motor to rotate the carriage and the motor to control the arc voltage are connected to flexible conductors and are mounted to move with the carriage. Suitable ceramic sheathing on the carriage prevents weld splatter on the mandrel and provides a concentric conduit for inert gas shielding of the tungsten weld tip as it orbits the mandrel axis.

The circular weld path is, typically, a steam generator tube sleeve to tube joint, a steam generator tube plug to tube joint, a tube sleeve plug to tube sleeve joint, or, a nozzle dam insert to nozzle dam joint. In any event, the weld path is generally circular and surrounds the feature, such as a hole, in the workpiece. The advancing and retracting feature provides what is typically up to a 0.63" retraction and advancement of the carriage and the weld tip it carries, to accommodate variations in the substantially circular workpiece weld path.

BRIEF DESCRIPTION OF THE DRAWINGS

FIG. 2 is a front elevational view of the tool of FIG. 1;

FIG. 3 is a plan view of the tool of FIGS. 1 and 2;

FIG. 4 is a cross-sectional elevational view taken along the line 4—4 of FIG. 3;

FIG. 5 is a cross-sectional elevational view taken along the line 3—3 of FIG. 2;

FIG. 6 is a plan view of the conductive shoe and tungsten weld tip shown in cross-section in assembled position in FIG. 4; and FIG. 7 is an elevational view of the conductive shoe and tungsten weld tip of FIGS. 4 and 6.

DESCRIPTION OF THE PREFERRED EMBODIMENT

Figure 1:
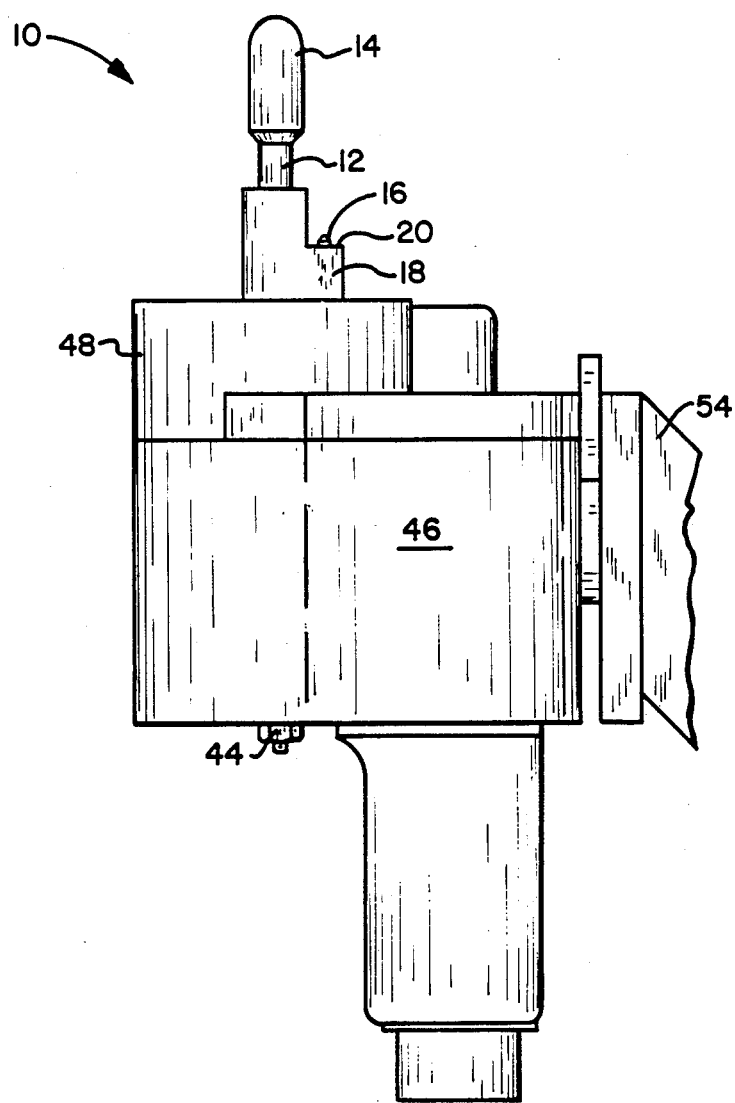
FIG. 1 is a side elevational view of the improved orbital weld head tool of the invention.

The numeral 10 generally designates the improved orbital weld head tool of the invention.

The tool 10 includes a mandrel 12 and workpiece feature engaging element 14 at the extreme projecting end thereof. The element 14 illustrated is for engagement of the interior wall of a steam generator tube. Equivalent feature engaging ends may be supplied, for example, in the form of an outwardly expanding, multi-fingered nozzle dam insert groove engaging element or a collet retainer for gripping a projecting workpiece feature such as a stud. Whatever workpiece adapting element 14 is mounted on the end of mandrel 12, however, the feature and element together act as a means for aligning and maintaining positioning of the tool 12 relative to the center of a desired substantially circular weld path on a workpiece to be arc welded by means of a gas shielded tungsten weld tip 16.

A ceramic sheath member 18, preferably of a non-hygroscopic material which is at least 95% by weight $Al_2O_3$, has a tensile strength of at least 20,000 P.S.I. and has a resistance to impact of at least 6.5 inch-lbs. when measured by the Charpy D256 test, provides sheathing for mandrel 12 and tungsten weld tip 16. This prevents weld splatter on the mandrel and provides a concentric conduit 19 for inert gas shielding of the weld tip 16.

Details of this material are disclosed in the aforementioned U.S. patent application Ser. No. 055,280.

As best seen in FIGS. 4 and 5, the weld tip 16 is mounted on a conductive shoe 20 and, together with sheath member 18, is mounted for orbital rotation about the axis of mandrel 12 and reciprocating in a path parallel to said axis toward and away from a workpiece engaged by element 14. The tip 16, sheath member 18 and shoe 20 are all mounted in a insulative carriage 22 which surrounds mandrel 12 and moves back and forth and around it within the tool housing 46. A drive flange 24, belt pulley 26 and drive belt 28 provide relative rotation of the unit through ball bearing assembly 30.

The ball bearing assembly 30 is conductive with a conductive lubricant and is as described in the aforementioned U.S. patent application Ser. No. 028,997. An annular conductive bearing cup or body 32 is connected to a flexible gas and power supply hose 34 and reciprocates with carriage 22. Gas is communicated through longitudinal openings 36 and annular grooves 37 in drive flange 24 from hose 34 to openings 38 in conductive shoe 20 and thence along weld tip 16 in concentric conduit 19.

A hollow insulator 40 with a central opening is appropriately sealed by O-rings 42 to prevent gas leakage along mandrel 12. A nut 44 holds the mandrel in place in the end of body or housing 46. A top 48 is secured to body 46 by means of cap screws 50. A mounting plate 52 is provided to attach the tool 10 to a manipulator arm 54 of the type used for steam generator repairs in nuclear steam supply system maintenance to reduce worker exposure to radiation.

In the lower portion 60 of the tool 10, the motors 62 and 64 are mounted for reciprocation with carriage 22. The motor 62 is the drive motor which has a drive pulley or pinion 66 for driving belt 28 to create rotation of the carriage. The motor 64 is the arc voltage control motor which reciprocates the carriage 22 and attendant structure, including portion 60 of tool 10, in response to the voltage of the arc as sensed by a conventional controller, not shown.

The welding system used with the tool 10 is, typically, a three component system consisting of two "Centaur Model 75" welding power supplies and an arc voltage controller manufactured by DIMETRICS, Inc. Arc voltage sensing is accomplished by the controller which causes the drive motor 64 to advance and close the gap between the tungsten weld tip 16 and the workpiece engaged by electrically isolated mandrel 12 and element 14, or to retract and open the gap. This arc control technique is conventional to those skilled in the art.

Upon actuation of the motor 64, a stationary ball nut 70, under a ball nut cover 72, drives carriage 22 by means of ball and screw assembly 74. The ball and screw assembly is a "THOMSON Saginaw #5669420" and is conventional in the power transmission art. The motors 62 and 64 used in tool 10 may, typically, be those known as "T.R.W. Model A-1230".

Reciprocation of the carriage 22 and attendant structure is sensed by limit switches such as switch 76, a "Grayhill #39-101". Rotation control is effected by limit switches of the type seen at 80 which engage a portion of rotating carriage 22. Switch 80 may be a "Micro Switch #311SX4-T". An "Amphenol" connector 82 connects conductors from the switches to the welding controller and power supply apparatus (not shown).

Thus, it will be seen that an improved orbital weld head tool for use in repairing nuclear steam supply systems with minimum exposure of the workmen to radiation has been provided.

I claim:

1. An improved orbital weld head tool comprising in combination:

means for fixedly engaging the inside of a hollow workpiece and aligning and maintaining fixed positioning of said tool relative to the workpiece and the center of a desired substantially circular weld path thereon;

a tungsten weld tip supported on a carriage which moves longitudinally along said means for engaging, aligning and maintaining fixed positioning of said tool;

means rotating said carriage and thereby orbiting said tungsten weld tip in substantially said desired circular weld path about an axis through said center;

means to sense the changing voltage of said welding arc during orbiting of said weld tip; and means for moving said means for oribting and said tungsten weld tip in a path parallel to said axis and toward and away from the workpiece in response to the magnitude of the voltage of said welding arc;

whereby variations in the workpiece weld path are accommodated to make a substantially uniform weld.

2. The improved orbital weld head tool of claim 1 which includes means for mounting on a manipulator arm.

3. The improved orbital weld head tool of claim 1 in which the carriage is of dielectric material and a component of the means for supplying voltage to said weld tip is a conductive shoe at the base of said weld tip, which shoe is mounted on said carriage.

4. The improved orbital weld head tool of claim 1 in which said carriage includes means for supplying inert gas to the tungsten weld tip.

5. The improved orbital weld head tool of claim 1 in which said carriage surrounds the means for aligning and maintaining positioning of said tool and is a component of the means for moving said means for orbiting and said tungsten weld tip.

6. The improved orbital weld head tool of claim 1 in which the carriage includes dielectric material sheaths for said means for aligning and maintaining positioning of said tool and said tungsten weld tip.

7. The improved orbital weld head tool of claim 6 in which the dielectric material sheath for said tungsten weld tip is spaced from said weld tip to permit the flow of gas along the weld tip emanating from a means for supplying inert gas included in the carriage.

8. The improved orbital weld head tool of claim 7 which includes, as a component of the means for moving said means for orbiting and said tungsten weld tip, an arc voltage control motor.

9. The improved orbital weld head tool of claim 8 which includes, as components of the means for moving said means for orbiting and said tungsten weld tip, a ball screw and ball nut.

10. The improved orbital weld head tool of claim 9 which includes, as components of the means for orbiting a rotational drive motor and a drive belt to rotate said carriage about said axis.

11. The improved orbital weld head tool of claim 10 which includes a current carrying and gas conducting ball bearing assembly in electrical and fluid communication with said weld tip, which assembly surrounds and is coaxial with the means for aligning and maintaining positioning of said tool and is connected to a source of controlled voltage and inert gas.

12. The improved orbital weld head tool of claim 11 in which the arc voltage control motor and the rotational drive motor move in a path parallel to said axis with movement of said carriage in a path parallel to said axis.

13. The improved orbital weld head tool of claim 12 in which limit switches are provided to control the carriage rotating and moving motors.

* * * * *